US011285896B2

(12) United States Patent
Friedman et al.

(10) Patent No.: US 11,285,896 B2
(45) Date of Patent: Mar. 29, 2022

(54) SYSTEM AND METHOD FOR VEHICLE SHARING

(71) Applicant: TOYOTA MOTOR ENGINEERING & MANUFACTURING NORTH AMERICA, INC., Plano, TX (US)

(72) Inventors: Scott A. Friedman, Dallas, TX (US); Prince R. Remegio, Lewisville, TX (US); Tim Uwe Falkenmayer, Mountain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 232 days.

(21) Appl. No.: 16/000,114

(22) Filed: Jun. 5, 2018

(65) Prior Publication Data
US 2019/0366959 A1    Dec. 5, 2019

(51) Int. Cl.
*B60R 16/037*    (2006.01)
*B60W 10/30*    (2006.01)
*B60W 50/00*    (2006.01)
*G01C 21/36*    (2006.01)
*G06Q 50/30*    (2012.01)
*G06Q 30/06*    (2012.01)
*B60Q 9/00*    (2006.01)

(52) U.S. Cl.
CPC .............. *B60R 16/037* (2013.01); *B60Q 9/00* (2013.01); *B60W 10/30* (2013.01); *B60W 50/0098* (2013.01); *G01C 21/362* (2013.01); *G06Q 30/0611* (2013.01); *G06Q 50/30* (2013.01); *B60W 2540/215* (2020.02); *B60W 2540/22* (2013.01); *B60W 2710/30* (2013.01)

(58) Field of Classification Search
CPC ........ B60R 16/037; B60Q 9/00; B60W 10/30; B60W 50/0098; B60W 2540/22; B60W 2710/30; G01C 21/362; G06Q 30/0611; G06Q 50/30
See application file for complete search history.

(56) References Cited

U.S. PATENT DOCUMENTS 8,532,921 B1    9/2013    Rovik et al.
8,918,231 B2    12/2014    Rovik et al.
(Continued)

*Primary Examiner* — Thomas Ingram
*Assistant Examiner* — Omar K Morsy
(74) *Attorney, Agent, or Firm* — Oblon, McClelland, Maier & Neustadt, L.L.P.

(57) ABSTRACT

A method, a system, and non-transitory computer readable medium for vehicle sharing are provided. The method includes receiving a user request via a ride share agent. The ride share agent is communicatively coupled to a server. The method further includes identifying a vehicle from one of ride share providers based on the user request, retrieving one or more settings associated with one or more systems of the identified vehicle from the server, determining a setting of a system of the identified vehicle based on at least one physical characteristic of the user when the setting of the system is not stored in the server, and implementing the one or more settings on the identified vehicle.

20 Claims, 5 Drawing Sheets

(56) References Cited

U.S. PATENT DOCUMENTS

| | | | |
|---|---|---|---|
| 8,958,955 B2* | 2/2015 | Hotary | B60N 2/809 |
| | | | 701/49 |
| 8,977,408 B1 | 3/2015 | Cazanas et al. | |
| 9,147,296 B2* | 9/2015 | Ricci | B60N 2/0244 |
| 9,348,492 B1* | 5/2016 | Penilla | B60W 40/08 |
| 9,533,640 B2 | 1/2017 | Rai | |
| 2013/0197674 A1 | 8/2013 | Lowry | |
| 2014/0247348 A1 | 9/2014 | Moore, Jr et al. | |
| 2016/0046300 A1 | 2/2016 | Wingfield et al. | |
| 2016/0173568 A1 | 6/2016 | Penilla et al. | |
| 2016/0321566 A1* | 11/2016 | Liu | G01C 21/3438 |
| 2017/0151918 A1 | 6/2017 | Boesen | |
| 2018/0225734 A1* | 8/2018 | Towal | G06Q 10/06 |

* cited by examiner

SYSTEM AND METHOD FOR VEHICLE SHARING

BACKGROUND

A shared vehicle system provides a good mix of flexibility, cost, and ease of use. Vehicles include components which can be adjusted by a user of the vehicle. However, when using a shared vehicle, the user has to readjust the components. U.S. Pat. No. 8,918,231 B2 entitled "Dynamic geometry support for vehicle components" by Rovik describes apparatuses and methods for adjusting a position of at least one component based on a user key associated with the user of the vehicle.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for vehicle sharing that receives a user request via a ride share agent. The ride share agent is communicatively coupled to a server. The method further identifies a vehicle from one of ride share providers based on the user request, retrieves one or more settings associated with one or more systems of the identified vehicle from the server, determines a setting of a system of the identified vehicle based on at least one physical characteristic of the user when the setting of the system is not stored in the server, and implements the one or more settings on the identified vehicle.

The present disclosure relates to a system for vehicle sharing. The system includes a server; a ride share agent communicatively coupled to the server; and processing circuitry. The processing circuitry is configured to receive a user request via a ride share agent communicatively coupled to a server, identify a vehicle from one of ride share providers based on the user request, retrieve one or more settings associated with one or more systems of the identified vehicle from the server, determine a setting of a system of the identified vehicle based on at least one physical characteristic of the user when the setting of the system is not stored in the server, and implement the one or more settings on the identified vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
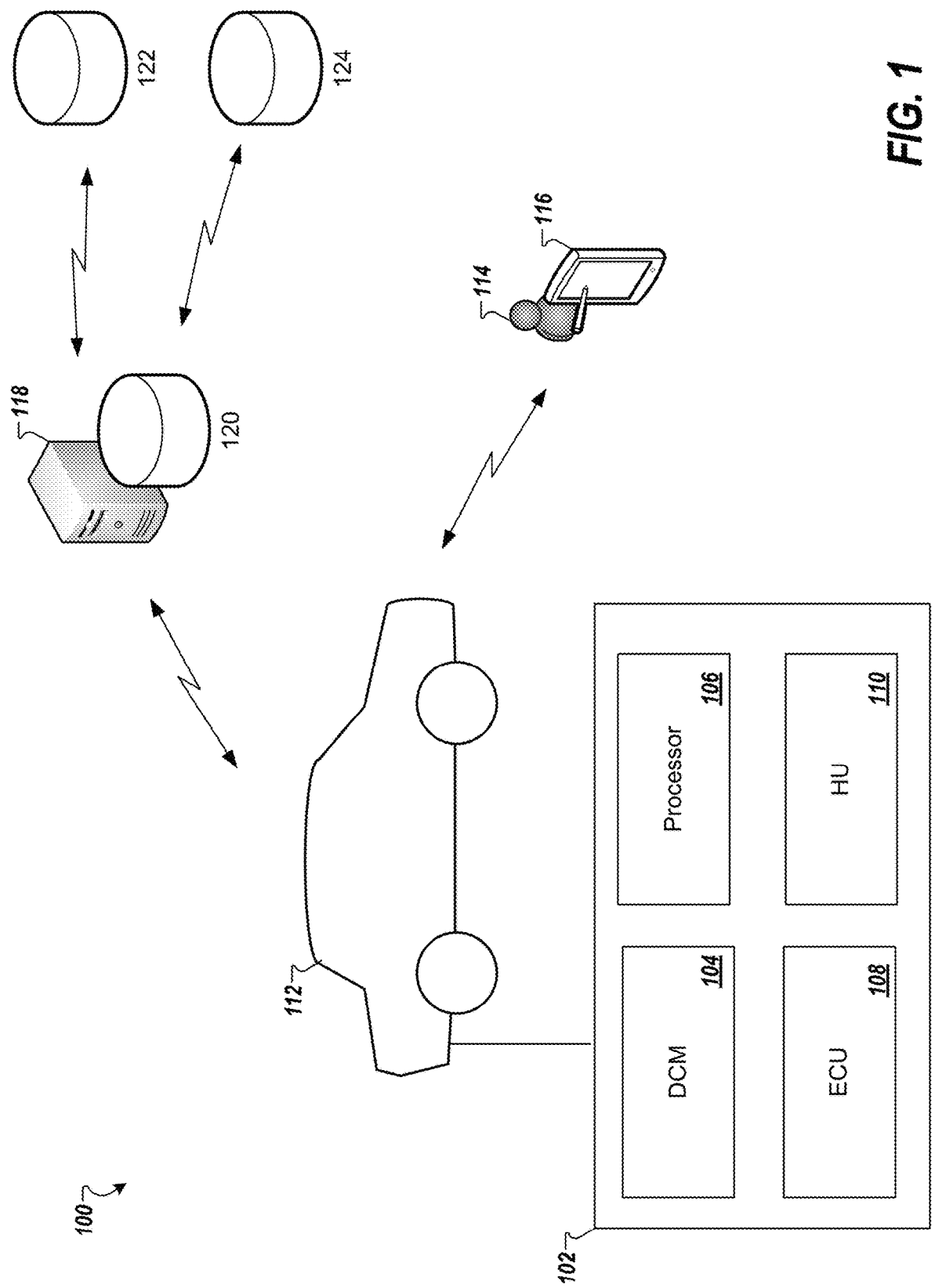
FIG. 1 is a schematic of a system environment according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/ dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system and associated methodology for shared vehicle management.

FIG. 1 is a schematic of a system environment 100 according to one example. A vehicle user 114 may connect via an electronic device 116 to an agent vehicle share service 118. The vehicle user 114 may request a vehicle using the electronic device 116. The agent 118 may operate on the electronic device 116 communicatively coupled to a remote server. In one implementation, the agent 118 may be a server such as a cloud-server. The agent 118 may identify a vehicle based on user preferences. The user preferences (e.g., vehicle profile) may include a vehicle make and model, color, payment information, customer loyalty information (e.g., reward), vehicle settings associated with a vehicle model such as seating adjustments, display height, audio settings, mirror position, steering wheel position, phone favorites, acoustic model settings, theme settings, air conditioning settings, language settings, and the like. The electronic device 116 may be a smartphone, a computer, a laptop, a head unit associated with a vehicle, or the like. A database 120 may be associated with the agent 118. The database 120 may store the user preferences associated with the vehicle user 114. The agent 118 is configured to process the user request. The agent 118 may identify a vehicle based on the user request and the user preferences retrieved from the database 118. The agent 118 may send a control signal to the identified vehicle 112 to control one or more systems of the identified vehicle 112 based on the user preferences as described further below.

The vehicle may be of any type of cars, trucks, sport utility vehicles, vans, mini-vans, automotive vehicles, commercial vehicles, agricultural vehicles, construction vehicles, specialty vehicles, recreational vehicles, buses, motorcycles, boats, yachts, or other types of vehicles. The vehicle may be gas-powered, diesel powered, electric, or solar-powered. The vehicle may be actively operated by a driver or may be partially or completely autonomous or self-driving.

The agent 118 may connect to a preferred shared vehicle database 122 and to a third party shared vehicle database 124. For example, the preferred shared vehicle database 122 may include vehicle information from a preferred provider such as the manufacturer associated with a preferred make and model. The vehicle information may include vehicle make and model, characteristics, and availability.

The vehicle system 102 may include a data communication module (DCM) 104, a processor 106, an electronic control unit (ECU) 108, and a head unit (HU) 110. The DCM 104 provides communications over a network to any server that may be included with multiple services available to the vehicle user such as the agent 118. The network may be a cellular network.

The head unit 110 may include multiple settings that include a language setting. The head unit 110 may receive input from the vehicle user via a user interface. The user interface may include buttons, a touch screen, a speaker, and a microphone. The head unit 110 may provide audio (e.g., audible alerts via the speaker) to the vehicle user 114. The head unit 110 may also provide navigation services, entertainment such as music, heating, ventilating, and air-conditioning information. The processor 106 may control one or more setting of the head unit 110 via the ECU 108.

The processor 106 may control mechanical and electro-mechanical subsystems such as a navigation system, an entertainment system, a vehicle system, an audio system, a passenger comfort system, an engine/transmission, and a driver assistance system.

The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM).

Figure 2:
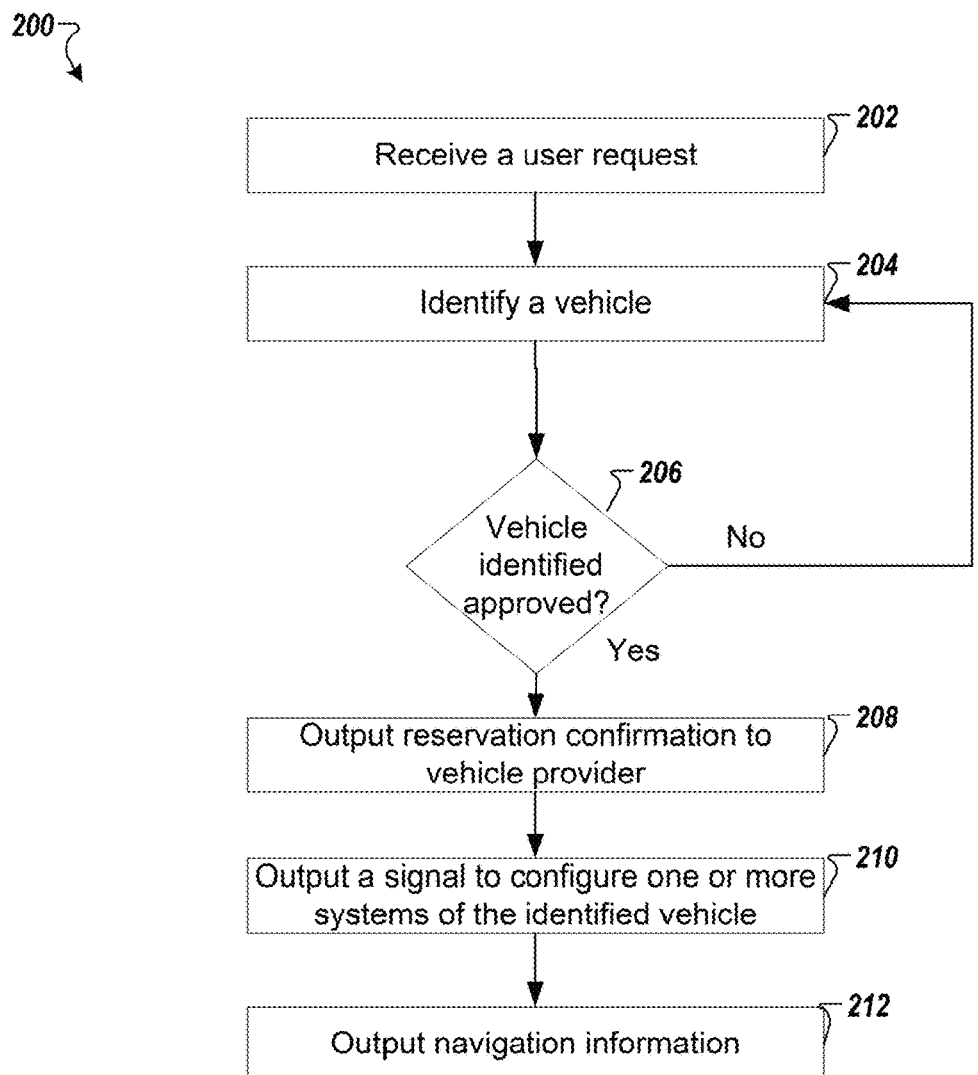
FIG. 2 is a flowchart for a ride sharing process according to one example.

FIG. 2 is a flowchart for a ride sharing process 200 according to one example. The ride sharing process 200 may be implemented by the agent 118. At step 202, the agent 118 may receive a user request (e.g., a voice command) for a shared vehicle. The user request may include a date and time, a location, and a provider.

At step 204, the agent 118 may identify a vehicle based on a plurality of factors. The plurality of factors includes the user preferences, the desired location, availability, and the like. The plurality of factors may also include whether the vehicle may be configured by the agent 118 based on the user preferences. In one implementation, the agent 118 may search for alternate providers (i.e., providers other than the preferred provider of the user 114) to determine whether offers, better vehicle selection are available. The agent 118 may search for alternate providers when a vehicle that snatches the user request is not available from the preferred provider.

The user request may be received by the agent 118 via a speech capture device. The agent 118 may execute one or more pattern matching algorithms to recognize a word or a command. The agent 118 may analyze phonemes in the context. For example, the agent 118 may compare the phonemes to a large library of known words, phrases, and sentences. The agent 118 then determines what contents the user 114 was probably saying.

At step 206, the agent 118 may prompt confirmation of whether the identified vehicle is acceptable to the user 114. In response to determining that the identified vehicle is acceptable to the user the process proceeds to step 208. In response to determining that the identified vehicle is not acceptable to the user, the process proceeds to step 204.

At step 208, the agent 118 may output a reservation confirmation to the vehicle provider of the identified vehicle.

At step 210, the agent may output a signal to the processor 106 of the identified vehicle that causes the processor 106 to configure one or more systems based on the user preferences. For example, the processor 106 may output a signal to the head unit 110 to adjust the base level in the audio settings (e.g., to loud) based on the user preferences. In one implementation, the processor 106 may control the actuator associated with the vehicle user 114 seats to adjust the seating position. In one implementation, the identified vehicle may display a personal greeting and prompt the user to confine whether to update vehicle system settings.

In one implementation, the agent 118 may check to see whether a vehicle profile associated with the vehicle user 114 for the identified vehicle is stored. The vehicle profile may include specific settings for a particular make/model. In response to determining that that a vehicle profile is not stored, the agent 118 may interpolate settings from stored vehicle profiles or the vehicle user 114 physical characteristics (e.g., height). For example, the agent 118 may determine the seat adjustment settings based on a height of the vehicle user 114. In one implementation, the agent 118 may retrieve a vehicle profile of the same make as the identified vehicle 112 in response to determining that a vehicle profile for the make/model of the identified vehicle is not sored. The agent 118 may also determine the settings from settings associated with the electronic device 116 such as language settings.

In one implementation, the head unit 110 may output an alert to the user that indicates that the vehicle profile has been downloaded and the vehicle is ready.

In one implementation, the head unit 110 may output an alert to the user via the user interface to confirm whether the user wants to proceed with the configuration of the one or more systems of the identified vehicle 112 based on the user preferences. In one implementation, the user may select a subset of the one or more systems to be configured based on the user preferences. For example, the processor 106 may configure the seating adjustment and not the air conditioning setting based on the subset identified by the user.

At step 212, the agent 118 may send destination information to the identified vehicle 112. In one implementation, the destination information may be retrieved from an electronic calendar of the vehicle user 114. For example, the agent 118 may retrieve the electronic calendar from the electronic device 116 based on the user request information. The agent 118 may determine navigation directions from a current location of the vehicle user 114 to a location of the identified vehicle 112. The agent 118 may output the navigation directions via the electronic device 116.

The agent 118 may determine navigation directions to a user destination. The user destination may be determined from the electronic calendar associated with the vehicle user. For example, the user request may be "reserve a car for my meeting on the 13$^{th}$ in Dallas." The agent 118 may retrieve the meeting location from the electronic calendar of the vehicle user based on information included in the user request. Then, the agent may transmit the navigation directions to the identified vehicle. Additionally or alternatively, the agent 118 may transmit the destination to the identified vehicle and instruct the navigation system of the identified vehicle to determine and display navigation directions to the destination.

Figure 3:
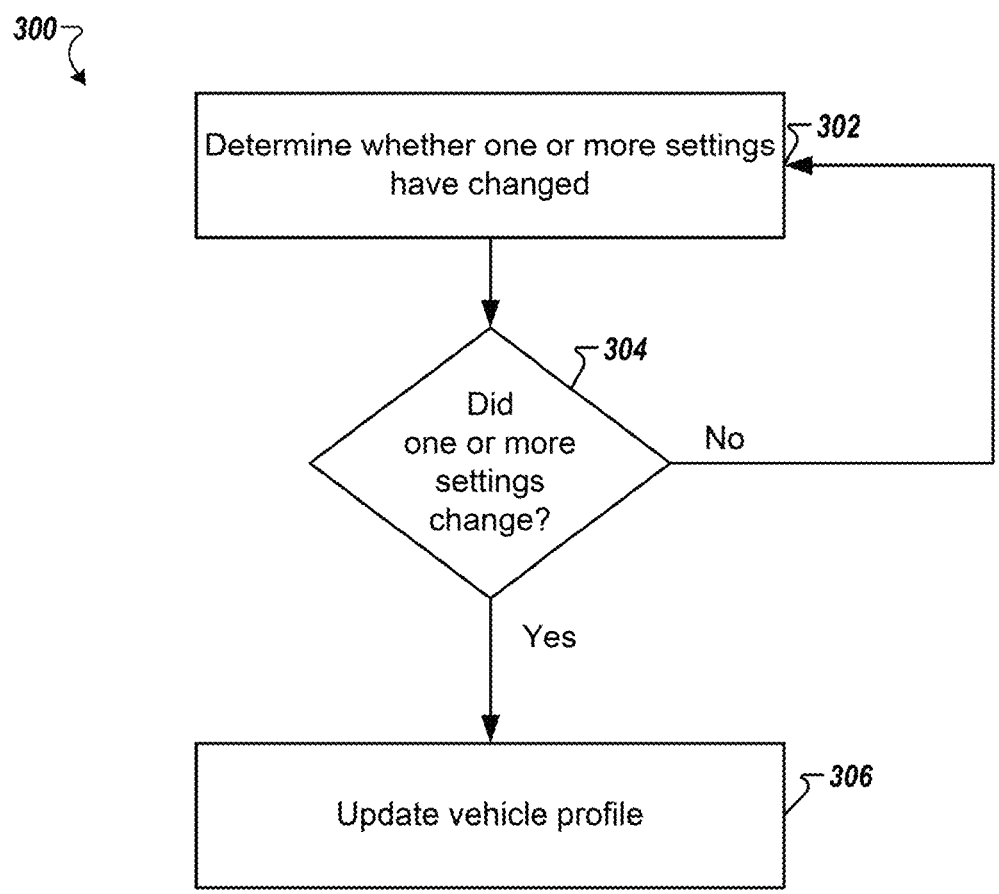
FIG. 3 is a flowchart for a method for updating a vehicle profile according to one example.

FIG. 3 is a flowchart for a method 300 for updating a vehicle profile according to one example. The method 300 may be implemented by the agent 118.

At step 302, the agent 118 may poll the vehicle associated with the vehicle user to determine whether one or more settings of the vehicle have changed. The vehicle may be one owned by the vehicle user or a vehicle shared (e.g., rented) for a trip. The agent 118 may poll the vehicle at predetermined periods or when an end of a trip is detected. The agent 118 may detect the end of a trip when the vehicle is in parked state. The detection of the parked state may be by detecting a setting of the vehicle in a parking gear, a lack of motion of the vehicle for a period of time, the opening and/or closing of a vehicle door, or a combination of such events. In one implementation, the processor 106 may automatically upload the updated setting via the DCM 104 to the agent 118 when a change is detected.

At step 304, in response to determining that one or more settings have changed, the process proceeds to step 306. In response to determining that none of the one or more settings have changed, the process proceeds to step 302.

At step 306, the agent 118 may update the user preferences. The agent 118 may also store an association between the updated settings and the vehicle (e.g., make and model). In one implementation, the agent 118 may prompt the vehicle user 114 to confirm whether to upload and update the user preferences.

In one implementation, the method 300 may be implemented by the processor 106.

Figure 4:
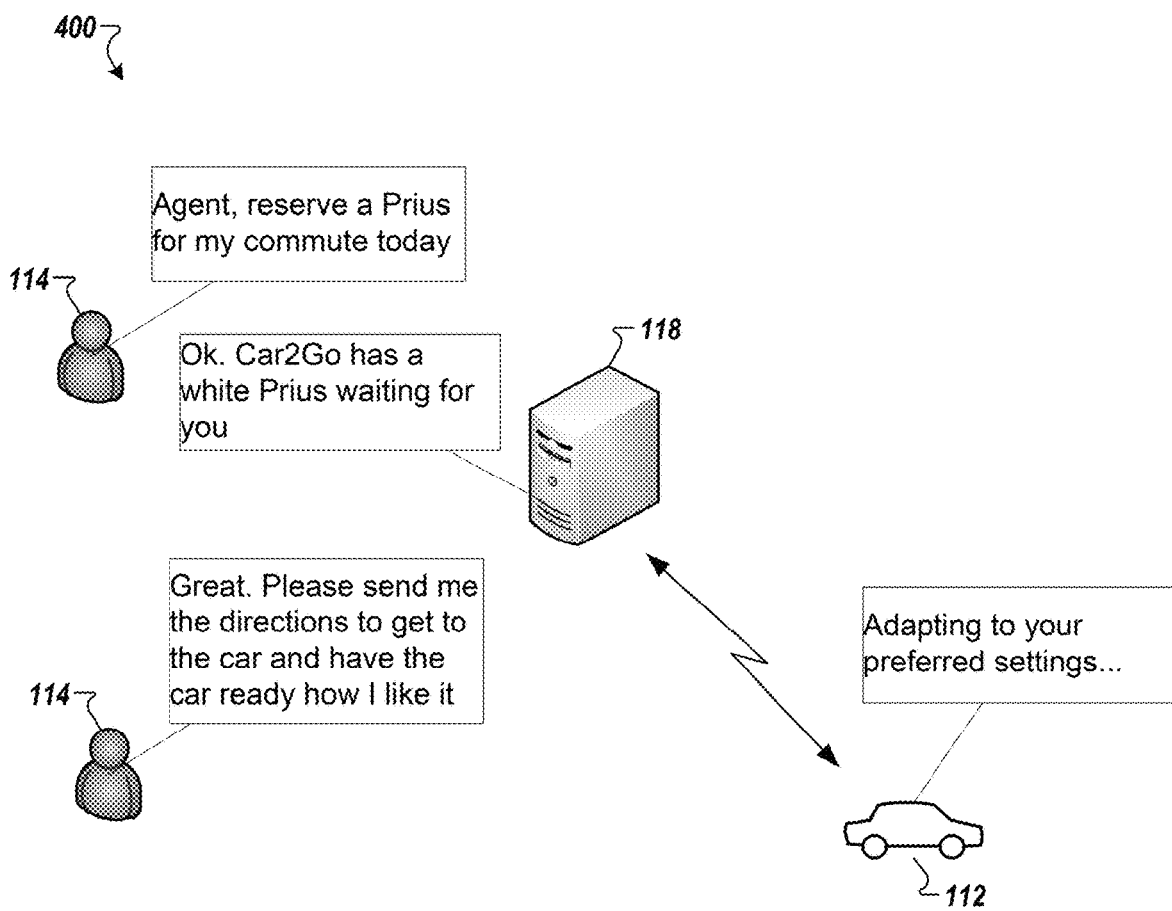
FIG. 4 is a schematic that shows an illustration of a ride sharing process according to one example.

FIG. 4 is a schematic 400 that shows an illustration of a ride sharing process according to one example. The vehicle user may output the voice command to the agent 118. The voice command may include a model of the vehicle and the date/time. The agent 118 may identify the vehicle and process the reservation. The agent 118 may output the identified vehicle information via an audible alert (e.g., via a speaker in the HU 110). The vehicle user may output additional requests such as navigation directions to the identified vehicle and preferred settings. As described previously herein, the identified vehicle 112 may output an audible alert indicating to the vehicle user that the vehicle is adapting to the preferred settings of the user.

Figure 5:
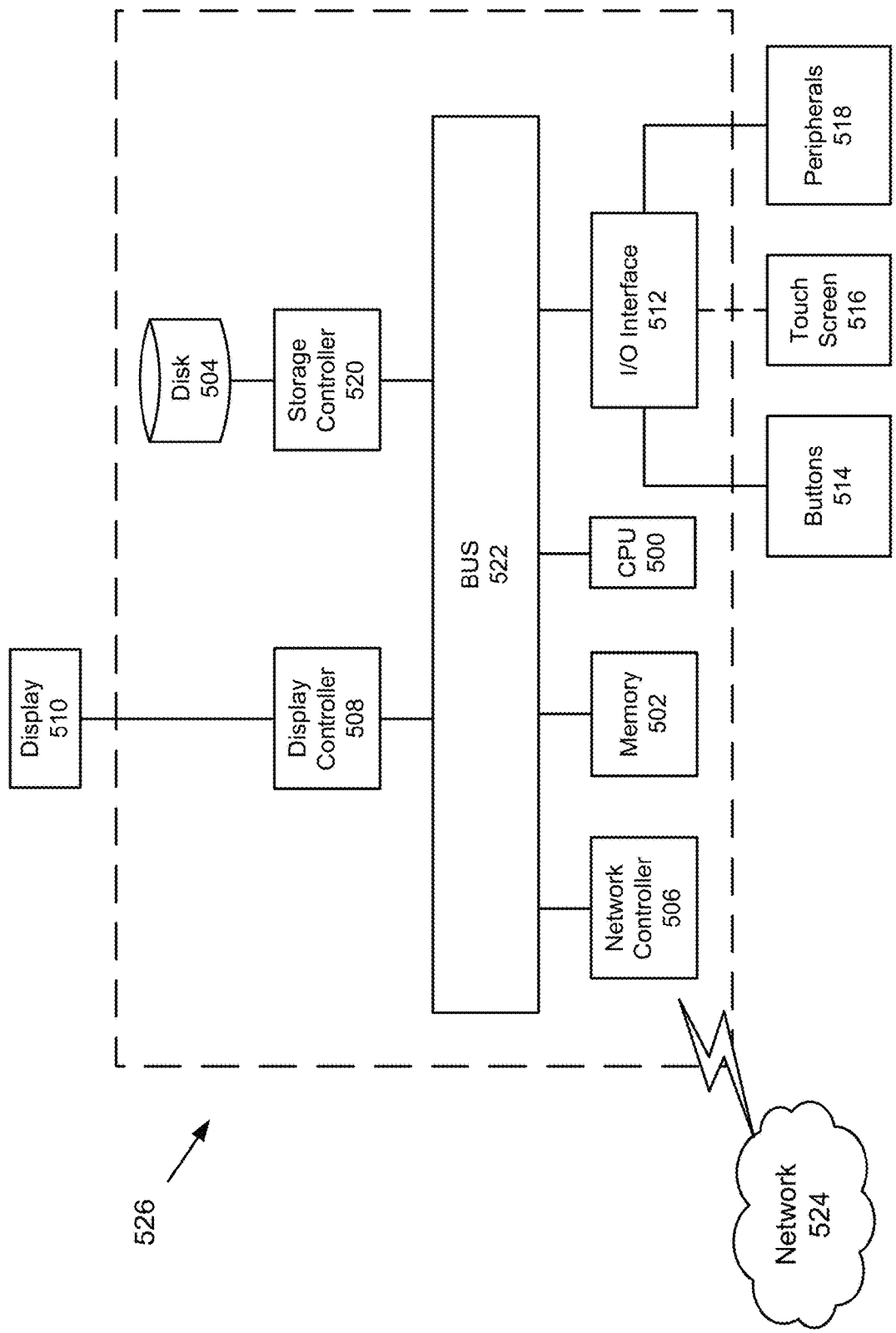
FIG. 5 is a block diagram of a controller according to one example.

In one implementation, the functions and processes of the agent 118 may be implemented by a computer 526. Next, a hardware description of the computer 526 according to exemplary embodiments is described with reference to FIG. 5. In FIG. 5, the computer 526 includes a CPU 500 which performs the processes described herein. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 526 communicates, such as a server or computer.

Further, the claimed advancements may be provided as a utility application, background daemon, or component of an operating system, or combination thereof, executing in conjunction with CPU 500 and an operating system such as Microsoft® Windows®, UNIX®, Oracle® Solaris, LINUX®, Apple macOS® and other systems known to those skilled in the art.

In order to achieve the computer 526, the hardware elements may be realized by various circuitry elements, known to those skilled in the art. For example, CPU 500 may be a Xenon® or Core® processor from Intel Corporation of America or an Opteron® processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computer 526 in FIG. 5 also includes a network controller 506, such as an Intel Ethernet PRO network interface card from Intel Corporation of America, for interfacing network 524. As can be appreciated, the network 524 can be a public network, such as the Internet, or a private network such as LAN or WAN network, or any combination thereof and can also include PSTN or ISDN sub-networks. The network 524 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 526 further includes a display controller 508, such as a NVIDIA® GeForce® GTX or Quadro® graphics adaptor from NVIDIA Corporation of America for interfacing with display 510, such as a Hewlett Packard® HPL2445w LCD monitor. A general purpose I/O interface 512 interfaces with a keyboard and/or mouse 514 as well as an optional touch screen panel 516 on or separate from display 510. General purpose I/O interface also connects to a variety of peripherals 518 including printers and scanners, such as an OfficeJet® or DeskJet® from Hewlett Packard®.

The general purpose storage controller 520 connects the storage medium disk 504 with communication bus 522, which may be an ISA, EISA, VESA, PCI, or similar, for interconnecting all of the components of the computer 526. A description of the general features and functionality of the display 510, keyboard and/or mouse 514, as well as the display controller 508, storage controller 520, network controller 506, and general purpose I/O interface 512 is omitted herein for brevity as these features are known.

The features of the present disclosure provide a multitude of improvements in the technical field of ride sharing. In particular, the agent identifies a vehicle and outputs settings of the vehicle user to the identified vehicle. Further, the operation of the vehicle is improved as the settings are predefined. Thus, the implementations described herein improve the functionality of the vehicle. Thus, the system and associated methodology described herein amount to significantly more than an abstract idea based on the improvements and advantages described herein.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific font's without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for vehicle sharing, the method comprising:
receiving a verbal user request via a ride share agent communicatively coupled to a server, the verbal user request being interpreted using voice recognition;
identifying, using processing circuitry, a vehicle from a preferred ride share provider based on the verbal user request and whether one or more systems of the vehicle can be set to preferred settings corresponding to a user corresponding to the verbal user request, the preferred settings including at least seat adjustment settings and language settings, wherein vehicles of another ride share provider are searched and identified when the preferred ride share provider does not have a vehicle matching the preferred settings;
retrieving, using the processing circuitry, one or more settings associated with the one or more systems of the identified vehicle from the server;
determining, using the processing circuitry, a setting of a system of the identified vehicle based on at least one physical characteristic of the user when the setting of the system is not stored in the server; and
implementing the one or more settings on the identified vehicle.

2. The method of claim 1, wherein the determining includes determining seat adjustment settings based on a height of the user.

3. The method of claim 1, wherein the determining includes interpolating settings from a vehicle of the same make as the identified vehicle.

4. The method of claim 1, wherein the implementing includes:
identifying a subset of the one or more systems based on a user input; and
implementing settings associated with the subset of the one or more systems on the identified vehicle.

5. The method of claim 1, further comprising:
outputting destination information of the user to a navigation system of the identified vehicle.

6. The method of claim 1, further comprising:
determining whether one or more settings associated with one or more systems of a second vehicle have changed; and
updating the one or more settings in the server.

7. The method of claim 6, wherein the updating the one or more settings includes:
prompting a user to confirm whether to update the one or more settings in the server; and
updating the one or more settings in the server in response to receiving an acknowledgment from the user.

8. The method of claim 1, wherein the one or more settings include at least one of seating adjustments, display height, mirror position, and steering wheel position.

9. The method of claim 1, wherein identifying the vehicle includes:
sending via the ride share agent to the user a message containing vehicle information, wherein the message contains one or more offers for an alternate provider;
receiving via the ride share agent a response to the one or more offers; and
identifying the vehicle based on the response.

10. The method of claim 1, further comprising:
outputting an alert to a speaker associated with the identified vehicle in response to implementing the one or more settings.

11. A system for vehicle sharing, the system comprising:
a server;
a ride share agent communicatively coupled to the server; and
processing circuitry configured to
receive a verbal user request via a ride share agent communicatively coupled to a server, the verbal user request being interpreted using voice recognition,
identify a vehicle from a preferred ride share provider based on the verbal user request and whether one or more systems of the vehicle can be set to preferred settings corresponding to a user corresponding to the verbal user request, the preferred settings including at least seat adjustment settings and language settings, wherein vehicles of another ride share provider are searched and identified when the preferred ride share provider does not have a vehicle matching the preferred settings,
retrieve one or more settings associated with one or more systems of the identified vehicle from the server,
determine a setting of a system of the identified vehicle based on at least one
physical characteristic of the user when the setting of the system is not stored in the server, and
implement the one or more settings on the identified vehicle.

12. The system of claim 11, wherein the determining includes determining seat adjustment settings based on a height of the user.

13. The system of claim 11, wherein the determining includes interpolate settings from a vehicle of the same make as the identified vehicle.

14. The system of claim 11, wherein the implementing includes:
identify a subset of the one or more systems based on a user input; and implement settings associated with the subset of the one or more systems on the identified vehicle.

15. The system of claim 11, wherein the processing circuitry is further configured to:
output destination information of the user to a navigation system of the identified vehicle.

16. The system of claim 11, wherein the processing circuitry is further configured to:
determine whether one or more settings associated with one or more systems of a second vehicle have changed; and
update the one or more settings in the server.

17. The system of claim 16, wherein the updating the one or more settings includes:
prompt a user to confirm whether to update the one or more settings in the server; and
update the one or more settings in the server in response to receiving an acknowledgment from the user.

18. The system of claim 11, wherein the one or more settings include at least one of seating adjustments, display height, mirror position, and steering wheel position.

19. The system of claim 11, wherein the processing circuitry is further configured to:
output an alert to a speaker associated with the identified vehicle in response to implementing the one or more settings.

20. A non-transitory computer readable medium storing computer-readable instructions therein which when executed by a computer cause the computer to perform a method for vehicle sharing, the method comprising:
receiving a verbal user request via a ride share agent communicatively coupled to a server, the verbal user request being interpreted using voice recognition;
identifying a vehicle from a preferred ride share provider based on the verbal user request and whether one or more systems of the vehicle can be set to preferred settings corresponding to a user corresponding to the verbal user request, the preferred settings including at least seat adjustment settings and language settings, wherein vehicles of another ride share provider are searched and identified when the preferred ride share provider does not have a vehicle matching the preferred settings;
retrieving one or more settings associated with one or more systems of the identified vehicle from the server;
determining a setting of a system of the identified vehicle based on at least one physical characteristic of the user when the setting of the system is not stored in the server; and
implementing the one or more settings on the identified vehicle.

* * * * *